July 9, 1929.  I. I. TUBBS  1,720,018

POWER TRANSMISSION MEANS

Filed April 19, 1926   2 Sheets-Sheet 1

Inventor
Ira Irl Tubbs.
By Geo Stevens
Attorney

July 9, 1929.　　　　I. I. TUBBS　　　　1,720,018
POWER TRANSMISSION MEANS
Filed April 19, 1926　　　2 Sheets-Sheet 2
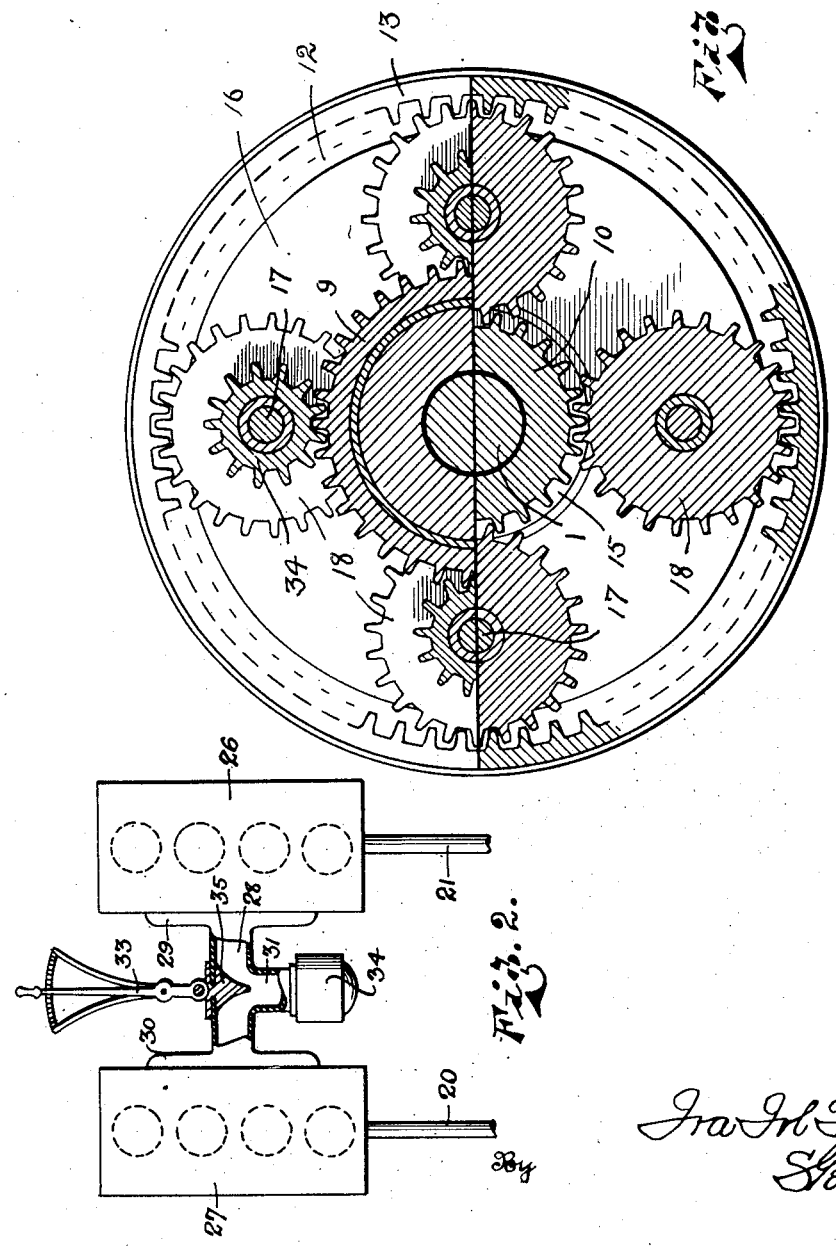
Inventor
Ira I. Tubbs.
Geo Stevens.
By
Attorney Patented July 9, 1929.

1,720,018

UNITED STATES PATENT OFFICE.

IRA IRL TUBBS, OF SUPERIOR, WISCONSIN.

POWER-TRANSMISSION MEANS.

Application filed April 19, 1926. Serial No. 103,007.

This invention relates to power transmission means and has special reference to such mechanism particularly adapted for use upon automobiles or the like where variation in the speeds and power is required.

The principal object of my present invention is to wholly obviate the necessity of any shifting mechanism or clutch directly associated with the transmission unit.

Another object is to provide a transmission unit of as simple, practical and durable construction as possible, and one wherein only the variation of speed of the driving means governs the speed, direction of rotation, and power of the driven means.

Still another object is that of providing a simple power transmission means between driving members and a driven member whereby the latter is under constant brake control.

Other objects and advantages will appear in the further description of the invention.

Referring now to the accompanying drawing, forming part of this application, and wherein like reference characters indicate like parts:

Figure 2 is a diagrammatic plan view of an arrangement of power units for driving the transmission unit illustrative of one embodiment of the invention; and Figure 3 is a vertical section, taken on the line 3—3, Figure 1.

Figure 1:
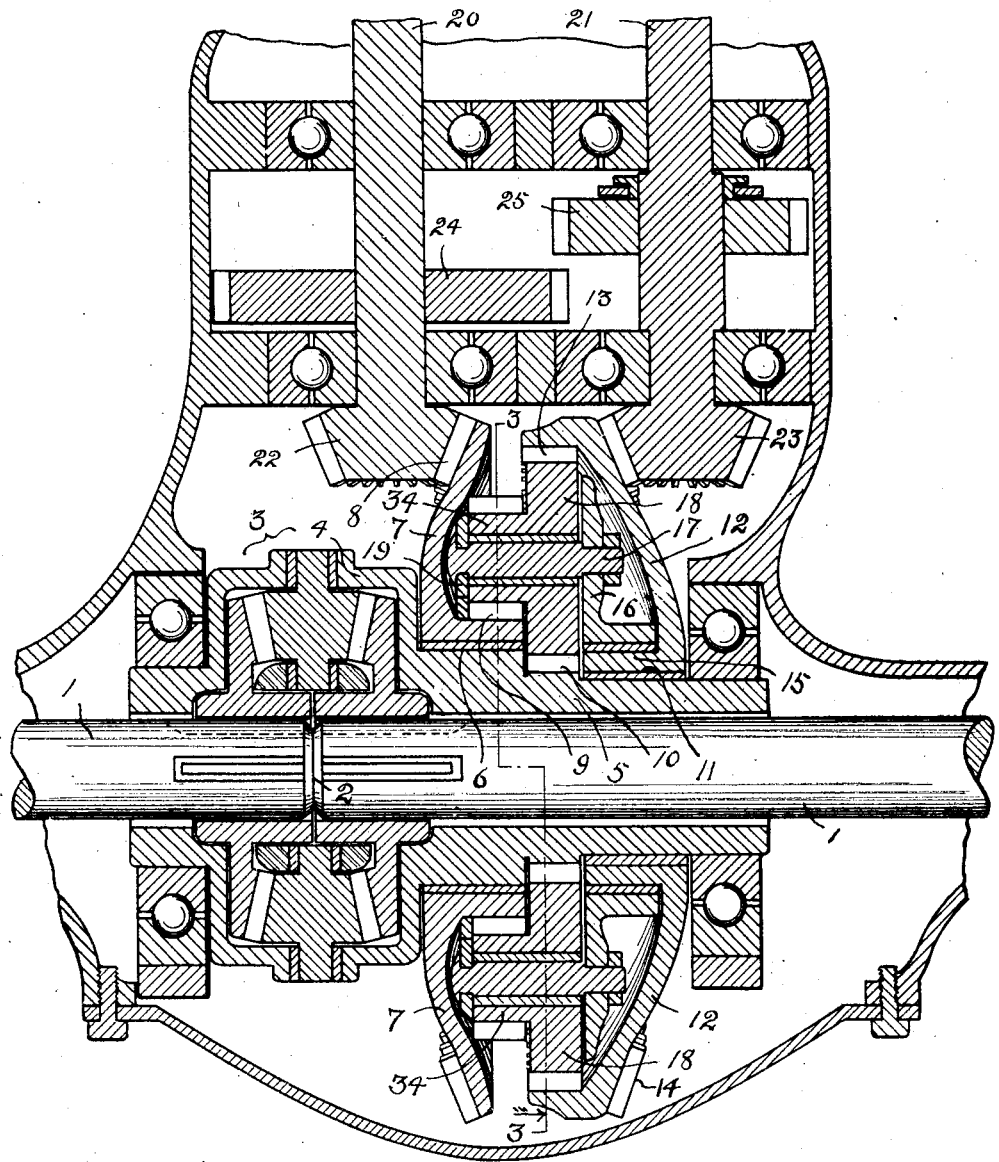
Figure 1 is a horizontal central section through one of the improved transmission devices having directly associated therewith the common differential as mounted upon the rear axle of an automobile.

In the application of the invention herein illustrated 1 represents the rear axle of the automobile, the same being divided as at 2, and about such division is mounted the ordinary beveled gear differential illustrated generally at 3 and differs in no respect from that in common use except that the housing 4 has a sleeve like extension 5 upon one side thereof, this extension surmounting one portion of the shaft 1. This extension has a plurality of stepped diameters, for example, first at 6 which loosely carries the disc like gear 7 carrying the beveled teeth circumferentially as at 8, and the spur geared surface upon its hub extension as at 9. The next reduced diameter of the sleeve is provided with a smaller spur geared surface at at 10, and a still further reduced or stepped diameter of the sleeve carries loosely as at 11 the geared disc 12, this latter carrying the internally spur geared surface 13 and externally the bevel geared surface 14. Upon the inwardly extending hub 15 of the disc 12 is loosely mounted the disc 16 carrying the gudgeons or pins 17 upon which are loosely mounted the planetary spur gears 18; the opposite ends of the gudgeons 17 being held by a suitable annular disc 19.

The parallel driving or engine shafts are shown at 20 and 21, the former terminating rearwardly in the beveled gear 22 which is in constant mesh with the bevel geared surface 8 of the disc 7, and the shaft 21 carries a like bevel gear 23 which is in constant meshed engagement with the bevel geared surface 14 on the disc 12.

These shafts carry just inwardly of the transmission assemblage and in any convenient manner the two spur gears 24 and 25 respectively, the latter being slidable upon the shaft 21 so as to be thrown into engagement with the gear 24 when desired. It will here be noted that the gear 25 is about 1/3 less in diameter than the gear 24. The engine of the shaft 21 is illustrated at 26, while the engine for the shaft 20 is indicated at 27, and these may be cooperative power units of any desired capacity.

As previously stated, the functioning of this novel transmission means resides in the differentiation of speed in the driving units, and to accomplish such differentiation I provide between the engines 26 and 27 means for manually changing the relative speeds thereof. Such means, in the embodiment illustrated, comprises a common conduit 28, one end communicating with one engine manifold 29 and the opposite end with the other manifold 30 of the engine 27, and the single intake 31 leading from the carburetor 34, which may be of any desired construction. Now, just above the mouth of the intake 31 into the common conduit 28 is mounted a double arcuately shaped sliding valve 35 which is slidably mounted in any desired manner on the side of the conduit 28 remote from the intake pipe 31. This valve is manually operable, for example, as by the rod 33 leading to any desired position in respect to the operator. The valve 35, as is obvious, simply controls the explosive mixture to the engines, and, if slid to the left will feed the engine 26 more gas than the engine 27, whereas if slid to the right, the opposite would result, changing as is evident the relative speed and power of the engines. It is further obvious that if the gears 24 and 25 on the driving shafts 20 and 21 are intermeshed, the latter shaft will be operating about one-third faster than the former, and were the valve 35 not adjusted to such relative position in respect to the feed from the carburetor to the engines, the engine 27 would be leading or driving the engine 26 in synchronism with the gear ratio.

The power transmission is so designed that this ratio of speed of the two driving shafts will not impart any motion whatever to the differential sleeve 5 which through the differential would conduct power to the axle 1 of the automobile. Such result is brought about by the relative diameters of the internal ring gear 13, planetary spur gears 18, 9, 10 and 34, the latter being a hub-like geared extension of the planetary gear 18 constantly meshing with the geared surface 9 of the hub of the disc 7.

The ratio of such gears and their relative action are as follows:

The beveled gears 22 and 23 on the drive shafts 20 and 21 are of the same diameter, and the disc gears 8 and 14 with which they mesh are of the same diameter; the ring gear 13 is three times the diameter of the planetary gears 18 so that one revolution of the ring gear 13 would normally cause each gear 18 to make three rotations, provided their centers were held stationary which however is not the case, and which motion would of course rotate the sleeve gear 10 three rotations, as it and the planetary gears 18 are of like diameter. The gears 34, formed integral with the planetary gears 18, are one-third the diameter of the disc gear 9 with which they intermesh, and which latter gear is rotating in the same direction as the internal gear 13 and its disc 12, though, as before stated, when the gears 24 and 25 are meshed, at a speed one-third less due to the ratio of said gears. Now, this being the case, the gears 34 will walk about upon the geared surface of the disc gear 9 while the latter also is advancing, and the gears 34, being one-half the diameter of the gears 18, will permit or cause a like walking effect of the gears 18 upon the sleeve gear 10 without imparting any motion whatsoever thereto; thus, as before stated, permitting the engines running at any speed desired though always at the same ratio in view of the interlocked relation of the gears 24 and 25 without imparting any motion whatever to the axle.

If the gears 24 and 25 are now disengaged and the engines allowed to run at a like speed as for example by placing the valve 35 in its midship or central position, the discs 7 and 12 will rotate at a like speed, causing the walking or planetary motion of the gears 18 to cease, as the disc gear 9 will be revolving at the same speed as the ring gear 13, thus preventing the gears 18 from walking about on the sleeve gear 10, and causing them, due to their locked cogged engagement therewith, to carry about with them the sleeve gear 10, thus imparting the same relative motion to the axle of the vehicle as that of the discs 7 and 12, the relation of speed between the engine shafts and the car axle being that produced by the difference in diameter of the beveled gears 22 and 23 and that of the gears 8 and 14 on the discs 7 and 12 respectively; the gears 22 and 23 being alike and the gears 8 and 14 being also alike.

If it is desired to slow up the speed of the axle 1 and yet run the engines at high speed in order to increase the power imparted to said axle, all that is necessary is to sufficiently change the relative speed of the engines by the manipulation of the sliding valve 35 and thereby cause the planetary gears 18 to walk about the sleeve gear 10, thus reducing the tendency to carry the sleeve gear at a like speed therewith.

If desired to increase the speed of the sleeve gear 10, a speeding up of the disc 7 and engine 20 in relation to the ring gear 13 and engine 27 will tend to produce a backward revolving motion of the planetary gears 18, as viewed in Figure 3, thus effecting an increase of speed of the peripheral surface of the gears 18 in a backward direction, though their centers are being carried forwardly in a planetary manner; it being remembered that the ratio of the gears 34 and 9 are the same as the ratio of the gears 13 and 18, that is, as 1 is to 3.

If it becomes desired to operate the sleeve gear 10 in the opposite direction, all that is necessary is to materially increase the speed of the engine which drives the gear 13 and decrease the speed of the engine which drives the gear disc 7 and with it the disc gear 9, so that the walking or planetary motion of the gears 18 will be sufficiently decreased to give said gears a backwardly revolving motion in respect to the disc gear 9 which will impart a backward thrust to the sleeve gear 10 meshing with the periferal or outer rim of the planetary gears 18, as clearly seen in Figure 3 of the drawings; it being obvious that this may be accomplished either by the disc gear 9 being held stationary while the gear 13 is rotated, or the speeds of the two gears 13 and 9 maintained at such relative ratio as to cause backward rotation of the gear 10, such ratio of gear action in this instance being substantially as 3 to 1, previously described.

From the foregoing it is evident that I have devised an exceedingly simple and compact universal power transmission means having any range of action desired between driven and driving members, the same requiring only a change of relative speeds of the driving members to accomplish the desired result in the driven means.

While I have shown a specific relation of gears in the accompanying embodiment, it is to be understood that the same may be varied considerably for different desired results without departing from the spirit of the invention.

Having thus described my invention, what I claim and desire to secure by Letters Patent is:

1. The combination with two independent geared driving units, of a disc gear meshing with each driving unit, a multiple pinion meshing with both disc gears, and a driven element meshing with the pinion.

2. The combination with independent driving gears and a driven element, of a transmission unit operatively connected therebetween, said unit comprising a disc gear meshing with each driving gear, and a multiple pinion meshing with said disc gears and the driven element.

3. The combination with two geared driving units and a driven member, of a disc gear meshing with either driving unit, a multiple pinion meshing with both disc gears and the driven member, means for varying the speed ratio of the driving units, and means for locking said units at a certain speed ratio.

4. The combination of two driving elements, each operable by an independent source of power means common to both power sources for varying their speed ratio, and means for locking said elements at a certain speed ratio.

5. In combination two driving shafts, independent means for operating said shafts, compensating gear mechanism comprising two circumferentially geared discs each operated by one of the shafts, gears intermediate of said discs and geared thereto and a shaft driven by the compensating mechanism.

6. In combination a compensating gear transmission mounted upon a rotative driven member comprising a freely rotative disc, gears rotatively carried upon said disc, other gears upon either side of said last mentioned gears and meshing therewith and the driven member, and separate driving shafts for rotating said last mentioned gears at different speeds.

7. A compensating transmission comprising a disc carrying a plurality of gudgeons diposed parallel with the axis thereof, stepped gears upon said gudgeons, a geared disc upon either side of the first mentioned disc and gears, one meshing with the smaller of said stepped gears and the other with the larger, separate driving means for the geared discs and a driven element meshing with the stepped gears.

8. In combination a geared driven member, a disc concentric with the driven member, planetary gears carried by said disc and meshing with the gear of the driven member, two driving gears concentric with the driven member both meshing with the planetary gears.

9. In combination a geared driven member, a disc concentric therewith and adjacent the geared portion thereof, stepped spur gears carried by the disc the larger portions of which are in mesh with the geared portion of the driven member, a concentric geared disc upon either side of the first mentioned disc and gears, one of said discs meshing with the larger portions of the stepped gears and the other with the smaller portions, and a power unit for each of the last mentioned discs.

10. The combination with two cooperative driving units, of a two part driven shaft carrying a differential mechanism thereupon, a geared sleeve upon one of the shafts for transmitting power through the differential to the shaft, and a compensating gear carried upon the sleeve meshing therewith and operated by the driving units.

11. The combination with driving gears and a driven element, of a transmission unit comprising disc gears having a plurality of geared faces one of which meshes with its respective driving unit, and a multiple pinion meshing with the other of said geared faces and the driven element.

12. The combination with two independent geared driving units, of disc gears having a plurality of geared faces, one of said faces in each gear meshing with a driving unit, a multiple pinion meshing with the other of said geared faces in each disc gear, and a driven element meshing with the pinion.

13. The combination with independent driving gears and a driven element, of a transmission unit operatively connected therebetween, said unit comprising disc gears having a plurality of geared faces one of which in each gear meshes with a driving gear, and a multiple pinion meshing with the other of said geared faces in each disc gear and the driven element.

14. The combination with two geared driving units and a driven member, of disc gears each having a plurality of geared faces one of which meshes with either driving unit, a multiple pinion meshing with the other of said faces of the disc gears and the driven member, means for varying the speed ratio of the driving units, and means for locking said units at a certain speed ratio.

15. The combination with driving gears, of a transmission unit operatively connected therebetween, said unit comprising disc gears having a plurality of geared faces one of which meshes with each driving gear, a multiple pinion meshing with the other of said geared faces, and a driven element meshing with one of the geared faces of the multiple pinion.

In testimony whereof I hereunto affix my signature.

IRA IRL TUBBS.